Patented Nov. 7, 1933

1,933,642

UNITED STATES PATENT OFFICE 1,933,642

METHOD OF MANUFACTURING PARA-OXOCAMPHOR

Kenzo Tamura, Iriarai-Cho, Gyokujo Kihara, Suna-Machi, Yasuhiko Asahina, Tozuka-Cho, and Morizo Ishidate, Suginami-Cho, Japan No Drawing. Application April 10, 1931, Serial No. 529,289, and in Japan August 7, 1930

2 Claims. (Cl. 260—133)

This invention relates to a process for the manufacture of para-oxocamphor and refers more particularly to a process for making allo-para-oxocamphor by oxidizing para-hydroxy-camphor with a moderate amount of anhydrous chromic acid or a bichromate. It has for its object to improve the production of allopara-oxocamphor.

In the years 1921 and 1923, Mr. Bredt and his associates originally manufactured para-oxocamphor which is shown in the following formula:—

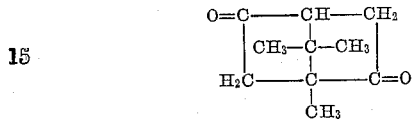

The Bredt's methods can be described briefly as follows:—

1. Dissolve bornyl acetate in glacial acetic acid; on heating the liquor to the temperature of 140° C., add an excessive amount of anhydrous chromic acid so as to oxidize it; subject the resulting para-oxobornylacetate to fractional distillation, and saponify the pure acetate with sodium carbonate; oxidize the product (para-oxoborneol) with chromic acid into para-oxocamphor.

2. It is reported that para-oxocamphor can be also produced, though it is small in amount, from camphor dissolved in glacial acetic acid by direct oxidation of the camphor with chromic acid.

The para-oxocamphor obtained according to these Bredt's methods is a snow-white substance, having a melting point of 209 to 210° C., a specific rotation of +103 to 104°, and its solution with permanganate of potassium is stable when it is cold.

The inventors have found that para-oxocamphor is obtainable also through oxidation of para-hydroxycamphor which may be prepared, for example, by separating from the urine of living bodies to which camphor has previously been given internally, and further that the final products vary according to the conditions of oxidation, these products being distinguishable into two kinds, namely:—

1. A substance which is exactly similar to the para-oxocamphor obtained following the Bredt's method, with a melting point of 209° to 210° C. and a specific rotation of +103° to 106°.

2. A substance which should be distinguished from the above, and regarded as a stereo-isomer. We named this new substance allo-para-oxocamphor. This substance is white and neutral, having a melting point of 200 to 202° C. and a specific rotation of +70 to 85°.

Allo-para-oxocamphor is clearly different from the ordinary para-oxocamphor, in respect of its melting point and optical activity, and further it has a peculiar feature in that it develops a pronounced degree of its own decolorizing reaction with a potash permanganate solution in a neutral state. In addition to this, it has a remarkable cardiotonic action even on the normal heat unlike the Bredt's product. The stimulant effect on the respiratory centre is also stronger than the Bredt's product.

The changes occurring in the above-mentioned treatment may be shown in the following formulæ:—

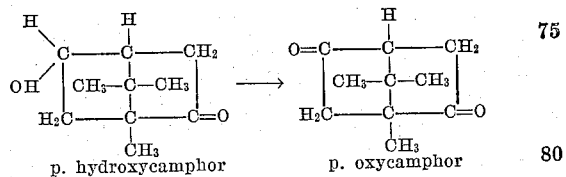

p. hydroxycamphor     p. oxycamphor

An example of carrying out the new method will now be described.

Dissolve 5 parts of para-hydroxycamphor with 150 parts of warm water; to the solution which is kept at the temperature of 30 to 40° C. is added 4 parts of sodium bichromate and 3 parts of sulphuric acid in succession; and then stand the liquor for 1 hour whilst shaking at room temperature; warm it up to the temperature of 30 to 40° C. again, and let it stand for about 2 hours.

In the above-mentioned treatment, the bichromate and sulphuric acid may be substituted by 4 to 5 parts of anhydrous chromic acid.

The said product will yield a yellow substance through oxidation whilst shaken with ether. Make the latter to a 2% aqueous solution and then make it weakly alkaline; remove the camphor-quinone by the addition of a few drops of hydrogen peroxide solution; shake the liquor again with ether to obtain therefrom a crude allo-para-oxocamphor; recrystallize it with a small amount of alcohol of about 20% to obtain a purified allo-para-oxocamphor. The dilute alcohol can be replaced either with petroleum ether or with pentane.

The purified substance is snow-white in colour having a melting point of 198 to 202° C. and a specific rotation of + 70 to 85° C.

In this method, final substances with various melting point and optical rotation are produced either by the use of an excessive amount of sulphuric acid or oxidizers, or due to the employed reaction-temperature which is higher than 50° C. The resulting products are mixtures of para-oxocamphor with a melting point of 210° C. and an optical rotation of + 103 to 104° and allo-para-oxocamphor with a melting point of 200° C. and an optical rotation of + 70 to 80° in various proportions, their melting points and optical rotations being between those of the said two substances.

What we claim is:

1. A method for producing allo-para-oxocamphor, comprising the step of oxidizing five parts of para-hydroxycamphor with four parts of sodium bichromate and three parts of sulphuric acid at a temperature lower than 50° C.

2. A method for producing allo-para-oxocamphor, comprising the steps of oxidizing five parts of para-hydroxycamphor with four parts of sodium bichromate and three parts of sulphuric acid at a temperature lower than 50° C. and treating the product with hydrogen peroxide in a weak alkaline condition in order to remove camphor-quinone.

KENZO TAMURA.
GYOKUJO KIHARA.
YASUHIKO ASAHINA.
MORIZO ISHIDATE.